(12) United States Patent
Nagai (10) Patent No.: US 8,181,683 B2
(45) Date of Patent: May 22, 2012

(54) PNEUMATIC TIRE WITH TREAD HAVING UPPER SURFACE SIPES AND WALL SURFACE SIPES

(75) Inventor: Kunihiko Nagai, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 624 days.

(21) Appl. No.: 12/332,449

(22) Filed: Dec. 11, 2008

(65) Prior Publication Data

US 2009/0178744 A1 Jul. 16, 2009

(30) Foreign Application Priority Data

Jan. 15, 2008 (JP) ................ 2008-005876

(51) Int. Cl.
*B60C 1/00* (2006.01)
*B60C 11/00* (2006.01)
*B60C 11/12* (2006.01)

(52) U.S. Cl. ........... 152/209.5; 152/209.17; 152/209.18; 152/209.23; 152/DIG. 3

(58) Field of Classification Search ............. 152/209.5, 152/209.17, 209.18, 209.23, DIG. 3
See application file for complete search history.

(56) References Cited

U.S. PATENT DOCUMENTS

| | | | | |
|---|---|---|---|---|
| 4,619,300 A | * | 10/1986 | Tokunaga et al. | 152/209.5 |
| 2003/0047263 A1 | * | 3/2003 | Lopez | 152/209.22 |

FOREIGN PATENT DOCUMENTS

| | | | |
|---|---|---|---|
| JP | 02-246809 | * | 10/1990 |
| JP | 03-169723 | * | 7/1991 |
| JP | 09-164817 | * | 6/1997 |
| JP | 9164817 A | | 6/1997 |
| JP | 2000-158915 | | 6/2000 |
| JP | 3110783 | * | 11/2000 |
| JP | 2001-121926 | * | 5/2001 |
| JP | 2001-277815 | * | 10/2001 |
| JP | 2002-192917 | | 7/2002 |
| JP | 2004-42773 | | 2/2004 |
| JP | 2004-098737 | * | 4/2004 |

OTHER PUBLICATIONS

Machine translation for Japan 2004-098737 (no date).*
Machine translation for Japan 2001-277815 (no date).*
Machine translation for Japan 2001-121926 (no date).*
Machine translation for Japan 09-164817 (no date).*
Machine translation for Japan 3110783 (no date).*
Translation for Japan 03-169723 (no date).*
Japanese Office Action dated Dec. 15, 2009, citing JP 2002-192917.
German Office Action for Application No. 10 2009 004 476, dated Aug. 17, 2010, 3 pages.

* cited by examiner

*Primary Examiner* — Steven D Maki
(74) *Attorney, Agent, or Firm* — Fish & Richardson P.C.

(57) ABSTRACT

A pneumatic tire has a plurality of upper surface sipes formed on an upper surface of the block and arranged in parallel so as to be spaced in a sipe width direction, and a wall surface sipe extending along a tire diametrical direction in a wall surface positioned in a longitudinal direction of the upper surface sipe. The wall surface sipe is arranged between a pair of adjacent the upper surface sipes.

6 Claims, 4 Drawing Sheets

PNEUMATIC TIRE WITH TREAD HAVING UPPER SURFACE SIPES AND WALL SURFACE SIPES

BACKGROUND OF THE INVENTION

1. Field of the Invention

The present invention relates to a pneumatic tire provided with a block in a tread surface, and is particularly useful as a studless tire.

2. Description of the Related Art

Conventionally, in the studless tire, a cut called as a sipe is formed in a block of a tread surface, and a traveling performance on an iced road surface having a low coefficient of friction is enhanced based on an edge effect and a drainage effect generated by the sipe. As the sipe mentioned above, a linear sipe and a waveform sipe are put to practical use, the linear sipe extending linearly along a longitudinal direction, and the waveform sipe extending like a wavy form or a zigzag form.

The inventor of the present invention pays attention to a fact that a motion of the block is great on the iced road surface, and a ground contact pressure within the block tends to be uneven due to the motion, for further enhancing the traveling performance on the iced road surface. Further, as a result of repeatedly making a study, it is found that a region in which the ground contact pressure becomes particularly high exists in the vicinity of a wall surface of the block, thereby enhancing the unevenness of the ground contact pressure and deteriorating the traveling performance on the iced road surface. A description will be given below of a knowledge relating to the ground contact pressure distribution mentioned above.

Figure 9:
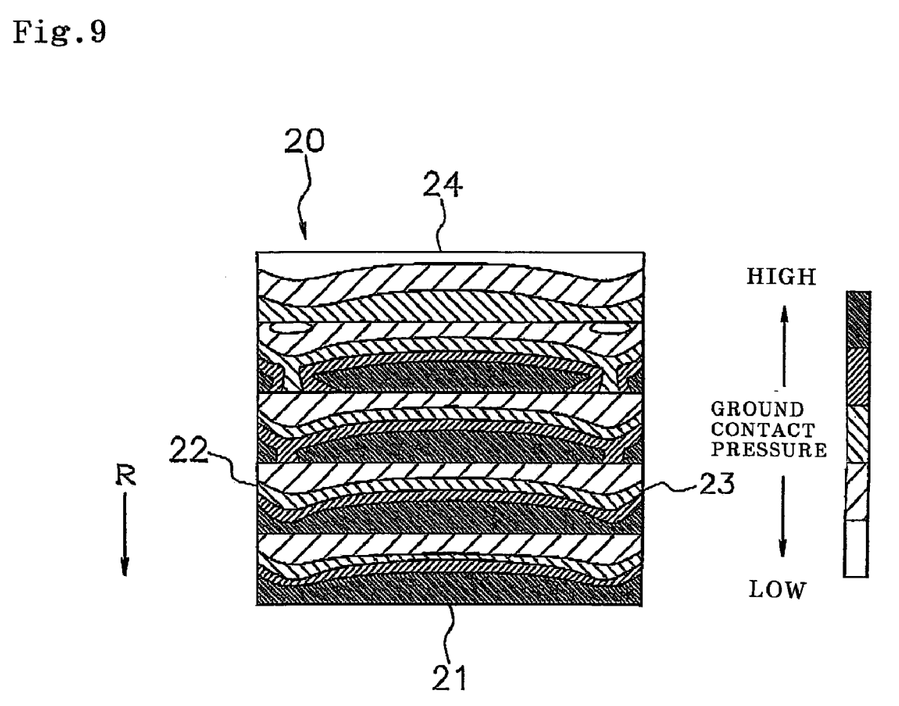
FIG. 9 is a conceptual view showing a ground contact pressure distribution within the block at a time of applying a braking force to the tire on an iced road surface.

FIG. 9 shows a ground contact pressure distribution within a block at a time of applying a braking force to a tire on an iced road surface, and an arrow R shows a turning direction of the tire. In accordance with this drawing, it is known that the ground contact pressure is high in a region close to a wall surface 21 forming a front side in the turning direction, and a region close to wall surfaces 22 and 23 in both sides thereof, thereby forming a factor enhancing unevenness of the ground contact pressure within the block 20. Further, in the case where a lateral force generated by a turning travel motion is applied, the ground contact pressure in the region close to the wall surfaces 22 and 23 becomes further higher. In this case, at a time of applying a driving force to the tire, an upside down tendency to FIG. 9 is generated, however, the ground contact pressure in the region close to the wall surfaces 22 and 23 becomes still higher.

Here, in Japanese Unexamined Patent Publication No. 2004-42773, there is described a tire in which a narrow groove extending in a tire diametrical direction is formed on a wall surface around a block. However, the tire is provided for removing a water film generated between the wall surface of the block and a snow ice, and does not suggest means for solving the unevenness of the ground contact pressure within the block mentioned above. Further, since a position where the sipe on the upper surface and the narrow groove on the wall surface are arranged within the same plane exists, in this tire, there is a problem that a rigidity of the block is locally and extremely lowered too much and a steering stability performance is deteriorated.

Further, in Japanese Unexamined Patent Publication No. 2001-121926, there is described a tire in which a step portion is integrally provided around a block, and a sipe extending in a tire diametrical direction is formed in a side wall of the step portion. However, the tire is provided for bringing the sipe formed in the side wall of the step portion into sight on the tread surface so as to enhance an edge effect, for securing a snow traction performance after medium and end stages of a wear, and does not suggest means for solving the unevenness of the ground contact pressure within the block. Since a rigidity of a peripheral portion of the block is improved by the step portion, the ground contact pressure in the region close to the wall surface tends to come up, and there is a risk of promoting the unevenness of the ground contact pressure within the block.

Further, in Japanese Unexamined Patent Publication No. 2000-158915, there is described a tire in which a wall surface of a block is provided with a plurality of reinforcing ribs extending approximately in parallel to a tread surface and protruding into a groove. However, the tire is provided for suppressing a lift of the block from the road surface caused by a bending deformation, and does not suggest means for solving the unevenness of the ground contact pressure within the block mentioned above. Japanese Unexamined Patent Publication No. 2000-158915 defines that the rigidity with respect to a shearing direction which are in parallel to the road surface and a compressing direction is not changed by forming the wall surface of the block as an accordion shape by the reinforcing rib.

SUMMARY OF THE INVENTION

The present invention is made by taking the above actual condition into consideration, and an object of the present invention is to provide a pneumatic tire which can uniformize a ground contact pressure within a block so as to enhance a traveling performance on an iced road surface, without locally lowering too much a rigidity of the block.

The object can be achieved by the present invention having the following structure. That is, the present invention provides a pneumatic tire provided with a block in a tread surface, comprising a plurality of upper surface sipes formed on an upper surface of the block and arranged in parallel so as to be spaced in a sipe width direction, and a wall surface sipe extending along a tire diametrical direction in a wall surface positioned in a longitudinal direction of the upper surface sipe and arranged between a pair of adjacent the upper surface sipes.

In the pneumatic tire in accordance with the present invention, since the sipe is formed on the wall surface positioned in the longitudinal direction of the upper surface sipe, it is possible to lower the rigidity of the region close to the wall surface. Accordingly, it is possible to uniformize the ground contact pressure within the block by dispersing the pressure in the region in which the ground contact pressure tends to be particularly high. Further, since the wall surface sipe is arranged between a pair of adjacent upper surface sipes, it is possible to avoid a structure in which the upper surface sipe and the wall surface sipe are arranged within the same plane, and it is possible to prevent the rigidity of the block from locally lowering too much. As mentioned above, in accordance with the present invention, it is possible to uniformize the ground contact pressure within the block so as to enhance the traveling performance on the iced road surface without locally lowering too much the rigidity of the block.

In the above structure, it is preferable that the wall surface sipe is terminated within the wall surface without being open to the upper surface of the block. Accordingly, it is possible to prevent the rigidity of the block from locally lowering too much in a ridge line portion between the upper surface and the wall surface of the block, and it is possible to preferably secure the steering stability performance or the like.

In the above structure, it is preferable that the block is provided with an upper layer portion arranged in an upper surface side, and a lower layer portion made of a harder rubber than the upper layer portion and arranged in an inner side in the tire diametrical direction of the upper layer portion, and the number of the wall surface sipe is set more in the lower layer portion than the upper layer portion. In accordance with the structure mentioned above, it is possible to make the rigidity balance between the upper layer portion and the lower layer portion of the block favorable so as to enhance the uniformity of the ground contact pressure within the block, while lowering the ground contact pressure in the region in which the ground contact pressure tends to become particularly high.

In the above structure, it is preferable that the block is provided with an upper layer portion arranged in an upper surface side, and a lower layer portion made of a harder rubber than the upper layer portion and arranged in an inner side in the tire diametrical direction of the upper layer portion, and the wall surface sipe is formed by a waveform sipe and the wave number of the wall surface sipe is set more in the lower layer portion than the upper layer portion. In accordance with the structure mentioned above, it is possible to make the rigidity balance between the upper layer portion and the lower layer portion of the block favorable so as to enhance the uniformity of the ground contact pressure within the block, while lowering the ground contact pressure in the region in which the ground contact pressure tends to become particularly high.

In the above structure, it is preferable that the wall surface sipe is arranged within a region which is between 0.1 W and 0.3 W from the upper surface sipe, in which a distance between a pair of adjacent the upper surface sipes is set to W. In accordance with the structure mentioned above, since the wall surface sipe is arranged in the region in which the ground contact pressure particularly tends to become high, among the regions which are close to the wall surface positioned in the longitudinal direction of the upper surface sipe, it is possible to effectively uniformize the ground contact pressure within the block.

DETAILED DESCRIPTION OF THE PREFERRED EMBODIMENTS

Figure 1:
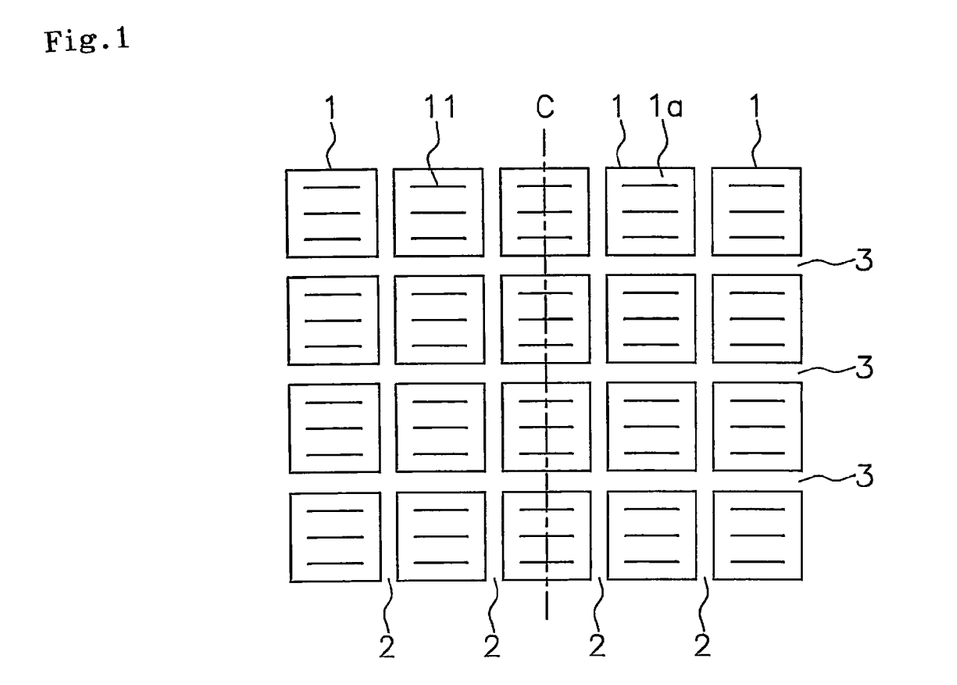
FIG. 1 is an expansion plan view showing an example of a tread surface of the pneumatic tire of the invention.

An embodiment of the present invention will be explained with reference to the drawings. FIG. 1 is an expansion plan view showing an example of a tread surface of the pneumatic tire of the invention. The pneumatic tire is provided with a tread pattern having a plurality of blocks 1. The block 1 is sectionalized by a main groove 2 extending in a tire circumferential direction and a lateral groove 3 extending in a tire width direction, and five rows of blocks 1 are arranged symmetrically with regard to a tire equator line C.

A plurality of (three in the present embodiment) upper surface sipes 11 having a linear opening portion are arranged in parallel in an upper surface 1a of each of the blocks 1 so as to be spaced in a sipe width direction. The upper surface sipe 11 is formed as a both-side closed sipe in which both ends are terminated within the upper surface 1a. In order to sufficiently generate an edge effect and a drainage effect, it is preferable that a sipe width of the upper surface sipe 11 is between 0.3 and 0.6 mm, and it is preferable that a sipe depth is between 30 and 80% of a depth of the main groove 2.

Figure 2:
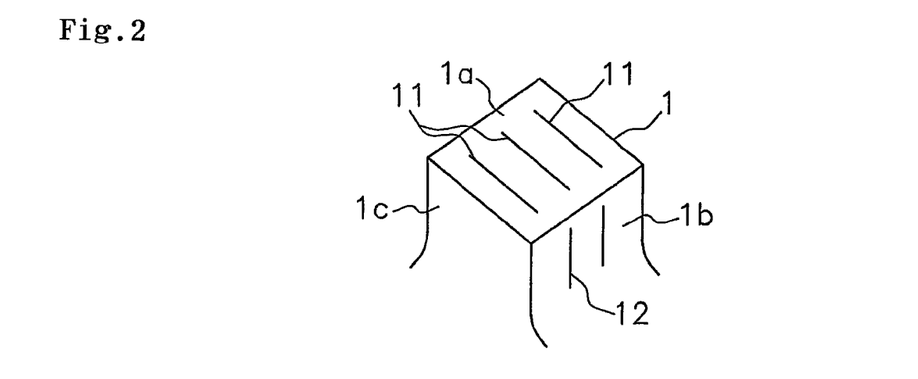
FIG. 2 is a perspective view of the block.
Figure 3:
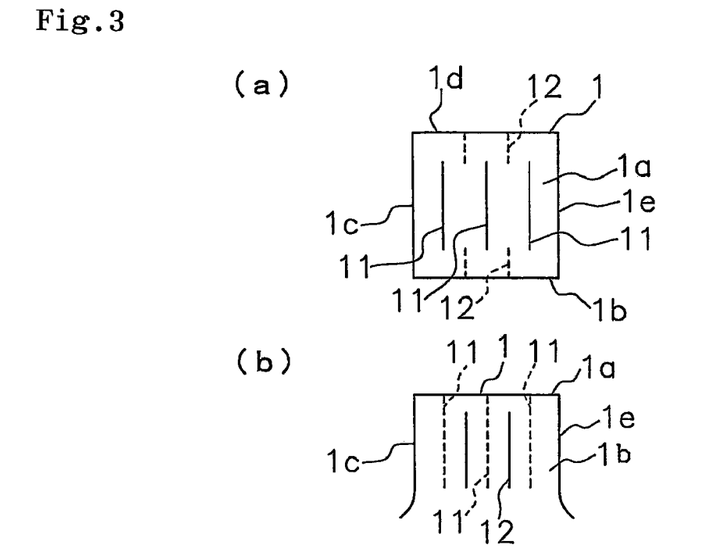
FIG. 3 is a perspective view of the block.

FIG. 2 is a perspective view of the block, and FIG. 3(a) is a plan view of the block and FIG. 3(b) is a side elevational view of the block. The block 1 in accordance with the present embodiment is formed as a rectangular parallel piped shape having a rectangular upper surface 1a, and has a pair of wall surfaces 1b and 1d which are positioned in a longitudinal direction of the upper surface sipe 11 so as to face to the main groove 2, and a pair of wall surfaces 1c and 1e which are positioned in a sipe width direction of the upper surface sipe 11 so as to face to the lateral groove 3.

In the wall surfaces 1b and 1d, a wall surface sipe 12 extending in a tire diametrical direction is arranged between a pair of adjacent upper surface sipes 11 and 11. In the present embodiment, two wall surface sipes 12 having a linear opening portion are arranged in parallel so as to be spaced at a predetermined interval, and are arranged at the midpoint of a pair of upper surface sipes 11 and 11 in such a manner as to prevent them from being arranged at a position within the same plane of the upper surface sipe 11.

A ground contact pressure in a region near the wall surfaces 1b and 1d of the block 1 tends to become high on the iced road surface, however, since the wall surface sipe 12 is formed, it is possible to uniformize the ground contact pressure within the block 1 by lowering a rigidity of the region near the wall surfaces 1b and 1d. Further, since the upper surface sipe 11 and the wall surface sipe 12 are not arranged within the same plane, it is possible to prevent the rigidity of the block 1 from locally lowering too much.

Figure 4:
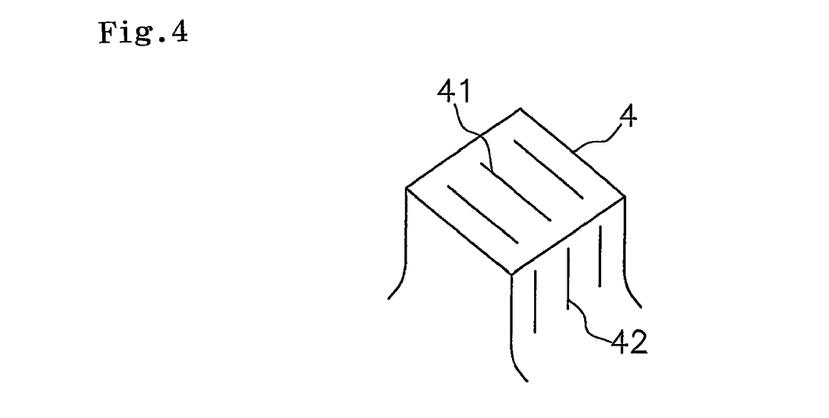
FIG. 4 is a perspective view of a block shown for comparing with the present invention.

On the contrary, the following problem is generated in the block 4 as shown in FIG. 4. In this block 4, an upper surface sipe 41 and a wall surface sipe 42 extend in parallel and are arranged within the same plane. Accordingly, a portion comparted by the upper surface sipe 41 and the wall surface sipe 42 behaves as a small block, the rigidity of the block 4 is locally lowered in spite that the upper surface sipe 41 is constituted by a closed sipe, and a disadvantage such that a steering stability performance is deteriorated is caused.

Figure 5:
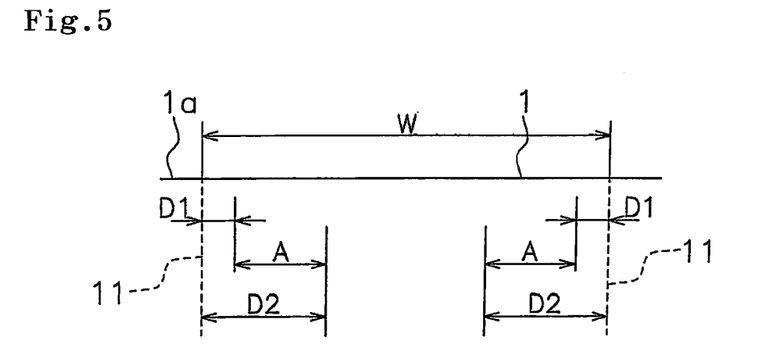
FIG. 5 is a side elevational view showing a substantial part of the block in an enlarged manner.

FIG. 5 is a side elevational view showing a substantial part of the block in an enlarged manner. Reference symbol W denotes a distance between a pair of upper surface sipes 11 and 11. In the present invention, in the case where the wall surface sipe 12 (not shown in FIG. 5) is arranged between a pair of adjacent upper surface sipes 11 and 11, it is preferable to set the wall surface sipe 12 apart from the upper surface sipe 11 at a distance D1 or more in the sipe width direction, and this distance D1 corresponds to 0.1 W. Accordingly, it is possible to secure an interval between the upper surface sipe 11 and the wall surface sipe 12, and to securely avoid the matter that they are arranged within the same plane, so that it is possible to prevent the rigidity of the block 1 from locally lowering too much.

Further, since the ground contact pressure becomes high particularly near the upper surface sipe 11 among the regions close to the wall surfaces 1b and 1d, at a time of braking and driving (refer to FIG. 9), it is preferable to arrange the wall surface sipe 12 within the region A. The region A corresponds to a region which is between 0.1 W and 0.3 W from the upper surface sipe 11, and the distance D2 accordingly corresponds to 0.3 W. Therefore, it is possible to effectively lower the rigidity of the region near the wall surfaces 1b and 1d. In this case, the reference symbols W, D1 and D2 mentioned above are assumed to be a distance measured with reference to the center in the sipe width direction.

The sipe width of the wall surface sipe 12 is not particularly limited as far as it can lower the rigidity of the region near the wall surfaces 1b and 1d, and is exemplified by 0.3 to 0.6 mm, however, the wall surface sipe 12 may be formed as a notch shape at the sipe width between 1.0 and 2.0 mm. The sipe depth of the wall surface sipe 12 is preferably between 0.3 and 1.5 mm, and is more preferably between 0.7 and 1.0 mm. It is preferable that the length in the tire diametrical direction of the wall surface sipe 12 is between 30 and 80% of the depth of the main groove 2.

In the present embodiment, the wall surface sipe 12 is terminated within the wall surface 1b without being open to the upper surface 1a of the block 1. In the present invention, the wall surface sipe 12 may be open to the upper surface of the block 1, however, it is possible to prevent the rigidity of the block 1 from locally lowering too much in a ridge line portion between the upper surface 1a and the wall surface 1b by forming the wall surface sipe 12 as the closed sipe as mentioned above, and it is possible to preferably secure the steering stability performance or the like.

In the present embodiment, both of the upper surface sipe 11 and the wall surface sipe 12 are formed as the linear sipe, however, in the present invention, a part or a whole of them can be formed as a waveform sipe. In the case where the upper surface sipe 11 is constituted by the waveform sipe, an opening portion of the upper surface sipe 11 is hard to become narrow, whereby it is possible to improve the edge effect and the drainage effect. Further, it is sufficient that at least one wall surface sipe 12 is formed, however, it is preferable that a plurality of wall surface sipes are formed for securely lowering the rigidity of the region near the wall surfaces 1b and 1d.

The wall surface sipe 12 may be inclined at an angle of ±30 degrees with respect to the tire diametrical direction as far as it is arranged between a pair of adjacent upper surface sipes 11 and 11. The angle is determined with reference to a center line passing through the center of the vibration amplitude in the case where the wall surface sipe 12 is constituted by the waveform sipe.

Figure 6:
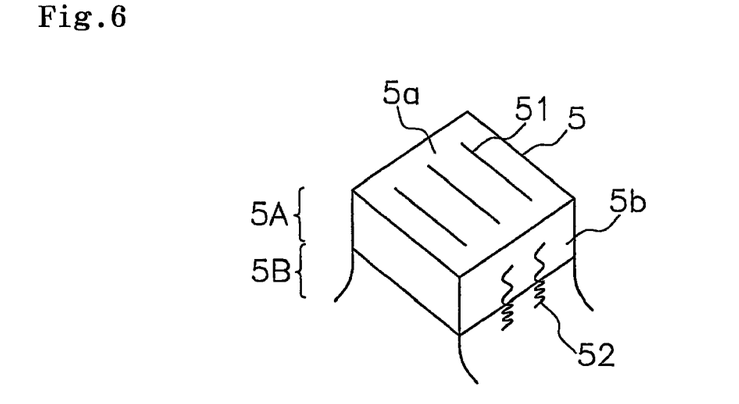
FIG. 6 is a perspective view of a block in another embodiment in accordance with the present invention.

FIG. 6 is a perspective view of a block in another embodiment in accordance with the present invention. The block 5 has a double-layer structure including an upper layer portion 5A arranged in an upper surface side, and a lower layer portion 5B made of a harder rubber than the upper layer portion 5A and arranged in a laminated manner in an inner side in the tire diametrical direction of the upper layer portion 5A. In the structure mentioned above, since the upper surface side of the block 5 is soft, it is easy to secure the ground contact area and it is possible to improve a traveling performance on the iced road surface, and since the root side of the block 5 is hard, it is possible to inhibit the block 5 from excessively collapsing and to secure the edge effect.

The block 5 is structured such that an upper surface sipe 51 corresponding to a linear sipe is formed in an upper surface 5a thereof, and a wall surface sipe 52 corresponding to a waveform sipe is formed in a wall surface 5b positioned in a longitudinal direction of the upper surface sipe 51. The wall surface sipe 52 is continuously provided from the upper layer portion 5A to the lower layer portion 5B, however, a wavelength is differentiated between the upper layer portion 5A and the lower layer portion 5B, and a wave number is set more in the lower layer portion 5B than the upper layer portion 5A. Accordingly, it is possible to make a rigidity balance between the upper layer portion 5A and the lower layer portion 5B favorable while lowering the ground contact pressure of the region close to the wall surface 5b, so that it is possible to enhance a uniformity of the ground contact pressure within the block 5.

A difference of a rubber hardness (a value obtained by measuring at a room temperature 23° C. in accordance with a durometer hardness test (type A) of JISK6253, the same is applied to the below) between the upper layer portion 5A and the lower layer portion 5B is exemplified by 45 to 55 degrees. Further, it is preferable that a boundary face between the upper layer portion 5A and the lower layer portion 5B is arranged in the center portion of the block 5, and it is specifically preferable that it is arranged at a depth position which is 45 to 55% of the depth of the main groove from the upper surface 5a.

Figure 7:
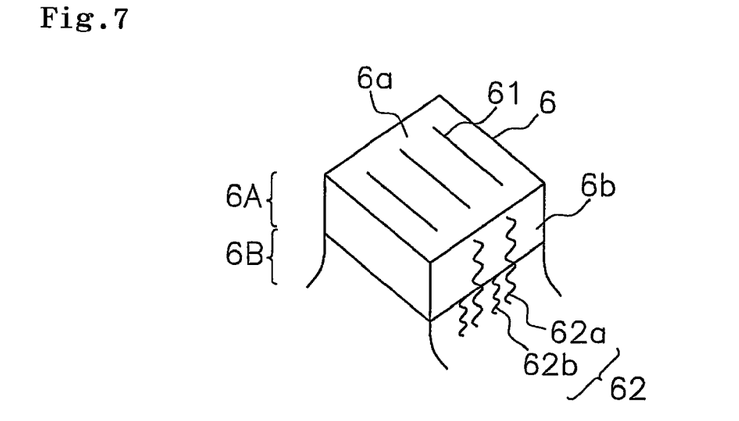
FIG. 7 is a perspective view of a block in another embodiment in accordance with the present invention.

FIG. 7 is a perspective view of a block in another embodiment in accordance with the present invention. The block 6 has a two-layer structure in which a hardness is differentiated between the upper layer portion 6A and the lower layer portion 6B, in the same manner as the block 5 mentioned above. The block 6 is structured such that an upper surface sipe 61 corresponding to a linear sipe is formed in an upper surface 6a thereof, and a wall surface sipe 62 corresponding to a waveform sipe is formed in a wall surface 6b positioned in a longitudinal direction of the upper surface sipe 61.

The wall surface sipe 62 includes a sipe 62a continuously extending from the upper layer portion 6A to the lower layer portion 6B, and a sipe 62b extending only within the lower layer portion 6B, and the number thereof is set more in the lower layer portion 6B than the upper layer portion 6A. In this case, both the sipe 62a and the sipe 62b are arranged between a pair of adjacent upper surface sipes 61 and 61. Accordingly, it is possible to make a rigidity balance between the upper layer portion 6A and the lower layer portion 6B favorable while lowering the ground contact pressure of the region close to the wall surface 6b, so that it is possible to enhance a uniformity of the ground contact pressure within the block 6.

In the examples in FIGS. 6 and 7, there is shown the example in which the number and the wave number of the wall surface sipe are changed between the upper layer portion and the lower layer portion, however, in place thereof or in addition thereto, it is possible to make a sipe depth larger in the lower layer portion than the upper layer portion, whereby it is possible to improve the rigidity balance between the upper layer portion and the lower layer portion.

The tire as mentioned above can be manufactured in the same manner as the conventional tire manufacturing step only by modifying a metal mold for a vulcanization molding such that a blade for forming the wall surface sipe is installed to the metal mold. In other words, since an inner peripheral surface of the metal mold for the vulcanization molding is provided with a rib portion 7 for forming a main groove and a lateral groove as shown in FIG. 8, and the block is formed by a concave portion 8 provided between the rib portions 7, the wall surface sipe as mentioned above can be formed by installing a blade 9 to a side portion of the rib portion 7.

Figure 8:
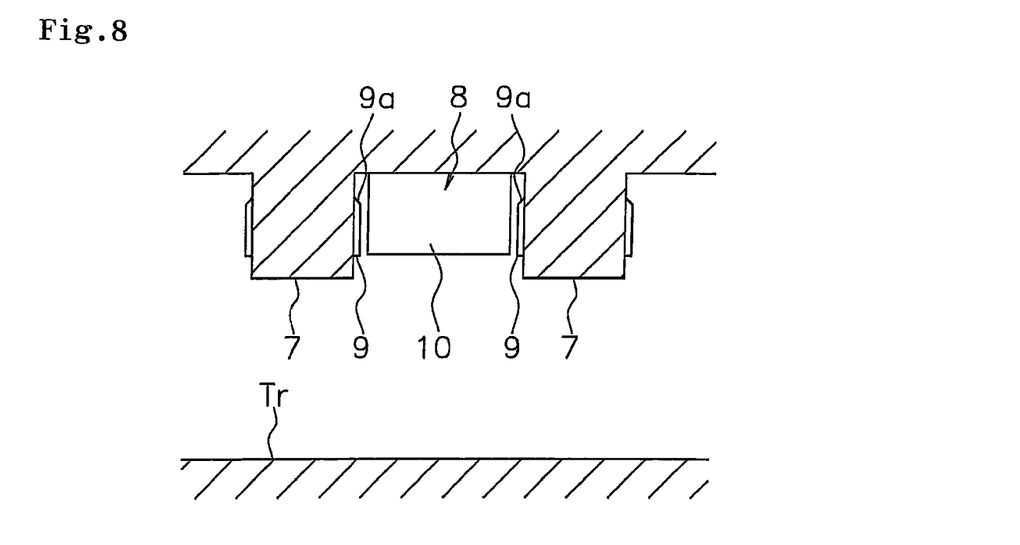
FIG. 8 is a cross sectional view of a substantial part of a metal mold for a vulcanization molding.

FIG. 8 illustrates the blade 9 for forming the wall surface sipe, and a blade 10 for forming the upper surface sipe. At a time of the vulcanization molding, the rib portion 7 and the concave portion 8 are pressed against a tread surface Tr of an unvulcanized tire and a predetermined tread pattern is formed. At that time, various sipes are formed by the blades 9 and 10. An end portion 9a forming an outer side in a tire diametrical direction of the blade 9 is formed as a taper shape or a circular arc shape, and is structured such that the blade 9 easily gets out of the block at a time of a mold release after the vulcanization molding.

The pneumatic tire in accordance with the present invention is the same as a normal pneumatic tire except that the sipes as mentioned above are provided in a block, and the known material, shape, structure, manufacturing method and the like can be applied to the present invention.

The present invention can be also applied to a so-called summer tire, however, since the present invention is excellent in the traveling performance on the iced road surface, the present invention is particularly useful as a studless tire (winter tire).

[Other Embodiment]

(1) The tread pattern of the pneumatic tire in accordance with the present invention is not particularly limited. Accordingly, the shape of the block is not limited to the rectangular shape, but it is possible to apply to blocks having various shapes such as a polygonal shape, a V-form shape and the like. Further, in the embodiment mentioned above, there is shown the example in which the longitudinal direction of the upper surface sipe is parallel to the tire width direction, however, the present invention is not limited to this.

(2) In the present invention, the upper surface sipe may be constituted by an open sipe in which an end portion is open to the wall surface, however, in the light of preventing the rigidity of the block from locally lowering too much, it is preferable to employ a closed sipe in which at least one end is terminated, and it is more preferable to employ a both-side closed sipe as mentioned above.

EXAMPLE

To concretely show the structure and effect of the present invention, the ice braking performance was evaluated. The ice braking performance was evaluated based on a braking distance at a time of operating an ABS by applying a braking force at a speed of 40 km/h while traveling on an iced road surface. An evaluation is shown by an index number in the case of setting a comparative example 1 to 100, and indicates that the larger the numerical value is, the better the ice braking performance is.

Comparative Examples 1 to 3

In the tire having the tread pattern shown in FIG. 1, the tire which is not provided with the wall surface sipe is set to a comparative example 1, the tire which is the same as the comparative example 1 except the structure in which the rib extending in parallel to the upper surface of the block is provided in the wall surface facing to the main groove is set to a comparative example 2, and the tire which is the same as the comparative example 1 except the structure in which the sipe extending in the tire diametrical direction is wholly provided in the wall surface around the block is set to a comparative example 3.

Examples 1 to 6

In the tire having the tread pattern shown in FIG. 1, the tire having the block structure shown in FIGS. 2 and 3 is set to an example 1, the tire which is the same as the example 1 except the structure in which the wall surface sipe is constituted by the waveform sipe is set to an example 2, the tire having the block structure shown in FIG. 6 is set to an example 3, the tire in which the wave number of the wall surface sipe 52 in the lower layer portion 5B in FIG. 6 is set to the same as that of the upper layer portion 5A is set to an example 4, the tire having the block structure shown in FIG. 7 is set to an example 5, and the tire in which the sipe 62b is continuously provided from the upper layer portion 6A to the lower layer portion 6B in FIG. 7 is set to an example 6.

In the comparative examples 1 to 3, and the examples 1 and 2, the rubber hardness of the block is set to 45 degrees. In the examples 3 to 6, the rubber hardness of the upper layer portion of the block is set to 45 degrees, and the rubber hardness of the lower layer portion is set to 55 degrees. Further, the tire size is set to 225/45R17 in all of them. Results of the evaluation are shown in Table 1.

TABLE 1

| | Comparative Example 1 | Comparative Example 2 | Comparative Example 3 | Example 1 | Example 2 | Example 3 | Example 4 | Example 5 | Example 6 |
|---|---|---|---|---|---|---|---|---|---|
| Ice braking Performance | 100 | 101 | 102 | 103 | 104 | 106 | 105 | 106 | 105 |

As shown in Table 1, in the examples 1 to 6, the ice braking performance is improved in comparison with the comparative examples 1 to 3. It is considered that this is because the ground contact pressure within the block can be uniformized by lowering the rigidity of the region near the wall surface by forming the wall surface sipe as mentioned above. Further, in the examples 3 and 5, the ice braking performance is improved in comparison with the examples 4 and 6, and there can be considered that the rigidity balance is improved between the upper layer portion and the lower layer portion of the block.

What is claimed is:

1. A pneumatic tire provided with a block in a tread surface, comprising:
   a plurality of upper surface sipes in the block, each of which has both ends terminated within an upper surface of the block, formed on the upper surface of the block and arranged in parallel so as to be spaced in a sipe width direction; and
   a wall surface sipe extending along a tire diametrical direction in a wall surface of the block positioned in a longitudinal direction of the upper surface sipes, and arranged between an adjacent pair of the upper surface sipes,
   wherein the block is provided with an upper layer portion arranged in an upper surface side, and with a lower layer portion made of a harder rubber than the upper layer portion and arranged in an inner side in the tire diametrical direction of the upper layer portion, a boundary face between the upper and the lower layer portions being at a depth position which is 45 to 55% of the depth of a main groove from the upper surface of the block, and wherein the number of the wall surface sipe is set more in the lower layer portion than in the upper layer portion.

2. The pneumatic tire according to claim 1, wherein the wall surface sipe is terminated within the wall surface without being open to the upper surface of the block.

3. The pneumatic tire according to claim 1, wherein the wall surface sipe is arranged within a region which is between 0.1 W and 0.3 W from the upper surface sipe, in which the distance between the pair of the upper surface sipes is set to W.

4. A pneumatic tire provided with a block in a tread surface, comprising:
   a plurality of upper surface sipes in the block, each of which has both ends terminated within an upper surface of the block, formed on the upper surface of the block and arranged in parallel so as to be spaced in a sipe width direction; and
   a wall surface sipe extending along a tire diametrical direction in a wall surface of the block positioned in a longitudinal direction of the upper surface sipes, and arranged between an adjacent pair of the upper surface sipes, wherein the block is provided with an upper layer portion arranged in an upper surface side, and with a lower layer portion made of a harder rubber than the upper layer portion and arranged in an inner side in the tire diametrical direction of the upper layer portion, a boundary face between the upper and the lower layer portions being at a depth position which is 45 to 55% of the depth of a main groove from the upper surface of the block, and wherein the wall surface sipe is formed by a waveform sipe and the wave number of the wall surface sipe is set more in the lower layer portion than in the upper layer portion.

5. The pneumatic tire according to claim 4, wherein the wall surface sipe is terminated within the wall surface without being open to the upper surface of the block.

6. The pneumatic tire according to claim 4, wherein the wall surface sipe is arranged within a region which is between 0.1 W and 0.3 W from the upper surface sipe, in which the distance between the adjacent pair of the upper surface sipes is set to W.

* * * * *

UNITED STATES PATENT AND TRADEMARK OFFICE
CERTIFICATE OF CORRECTION

PATENT NO. : 8,181,683 B2  Page 1 of 1
APPLICATION NO. : 12/332449
DATED : May 22, 2012
INVENTOR(S) : Kunihiko Nagai It is certified that error appears in the above-identified patent and that said Letters Patent is hereby corrected as shown below:

Title Page, Item (57) (Abstract, line 7), after "adjacent", delete "the".

Column 9, line 11, (Claim 3, line 4), delete "the pair" and insert --the adjacent pair--.

Signed and Sealed this
Thirtieth Day of October, 2012

David J. Kappos
*Director of the United States Patent and Trademark Office*